(12) United States Patent
Glickman et al.

(10) Patent No.: US 9,701,472 B2
(45) Date of Patent: Jul. 11, 2017

(54) CHASSIS STACKER

(71) Applicant: Mi-Jack Products, Inc., Hazel Crest, IL (US)

(72) Inventors: Myron Glickman, Arlington Heights, IL (US); John J. Lanigan, Sr., Orland Park, IL (US); John J. Lanigan, Jr., New Lenox, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 0 days.

(21) Appl. No.: 15/340,727

(22) Filed: Nov. 1, 2016

(65) Prior Publication Data

US 2017/0043951 A1    Feb. 16, 2017

Related U.S. Application Data

(60) Division of application No. 13/359,119, filed on Jan. 26, 2012, now Pat. No. 9,505,555, which is a continuation-in-part of application No. 13/175,526, filed on Jul. 1, 2011, now Pat. No. 9,574,363.

(51) Int. Cl.
*B65G 1/04* (2006.01)

(52) U.S. Cl.
CPC ......... *B65G 1/0464* (2013.01); *B65G 1/0442* (2013.01); *B65G 2201/0294* (2013.01)

(58) Field of Classification Search
CPC ............... B65G 1/0464; B65G 1/0442; B65G 2201/0294
See application file for complete search history.

(56) References Cited

U.S. PATENT DOCUMENTS

| | | | | |
|---|---|---|---|---|
| 2,238,573 A | * | 4/1941 | Steedman | B66F 7/02 187/208 |
| 3,519,150 A | * | 7/1970 | Keenan | B65G 1/0428 414/273 |
| 4,427,117 A | * | 1/1984 | Matthewson | B65G 1/14 211/13.1 |
| 4,437,807 A | * | 3/1984 | Perrott | B66F 9/18 294/119.1 |
| 4,439,094 A | * | 3/1984 | Riley | B60P 1/04 414/266 |
| 4,549,663 A | * | 10/1985 | Corbett, Jr. | B65G 1/14 211/13.1 |

(Continued)

*Primary Examiner* — Michael McCullough
*Assistant Examiner* — Ashley Romano
(74) *Attorney, Agent, or Firm* — McCracken & Gillen LLC

(57) ABSTRACT

A method for storing an empty trailer chassis includes positioning a trailer chassis between a first and a second vertical storage rack and lowering first and second stabilizing beams along the vertical storage racks toward the trailer chassis. The first and second stabilizing-beam trolleys are attached to the respective first and second stabilizing beams and a spreader extends between the first and second stabilizing-beam trolleys. The spreader contains a chassis clamping mechanism that forms a downward-facing portion of the spreader. The chassis clamping mechanism is disposed below the first and second stabilizing beams. The method further includes engaging the trailer chassis with the chassis clamping mechanism. The first and second stabilizing beams are above the trailer chassis when the chassis-clamping mechanism has engaged the trailer chassis.

11 Claims, 25 Drawing Sheets

(56) References Cited

U.S. PATENT DOCUMENTS

| | | | | |
|---|---|---|---|---|
| 4,600,350 | A * | 7/1986 | Matthewson | B66F 9/18 294/106 |
| 4,826,384 | A * | 5/1989 | Okura | B65G 1/127 410/31 |
| 4,936,730 | A * | 6/1990 | Morioka | E04H 6/282 414/239 |
| 4,952,118 | A * | 8/1990 | Macmillan | B65G 1/02 211/13.1 |
| 4,971,506 | A * | 11/1990 | Givati | E04H 6/22 414/228 |
| 5,551,831 | A * | 9/1996 | Corbett | B65G 1/00 211/85.8 |
| 6,325,586 | B1 * | 12/2001 | Loy | B65G 1/02 414/281 |
| 6,345,948 | B1 * | 2/2002 | Irish | E04H 6/424 414/234 |
| 6,626,304 | B1 * | 9/2003 | Corbett | B65G 1/14 211/85.8 |
| 7,316,536 | B2 * | 1/2008 | Evans | B65G 1/137 414/270 |
| 8,613,582 | B2 * | 12/2013 | Shani | E04H 6/22 414/232 |
| 2005/0220559 | A1 * | 10/2005 | Yang | B65D 88/129 410/56 |
| 2007/0032903 | A1 * | 2/2007 | Tsujimoto | B65G 1/0407 700/214 |
| 2007/0128009 | A1 * | 6/2007 | Lee | E04H 6/186 414/253 |
| 2008/0075566 | A1 * | 3/2008 | Benedict | E04H 6/182 414/228 |
| 2008/0075568 | A1 * | 3/2008 | Benedict | B63C 15/00 414/267 |
| 2008/0075569 | A1 * | 3/2008 | Benedict | B65G 1/0464 414/269 |
| 2008/0208389 | A1 * | 8/2008 | Checketts | G06Q 10/06 700/214 |
| 2009/0261546 | A1 * | 10/2009 | Rowland | B60P 1/6481 280/33.997 |
| 2010/0034626 | A1 * | 2/2010 | Reiniger | E04H 6/183 414/253 |
| 2010/0183409 | A1 * | 7/2010 | Checketts | B60K 17/30 414/231 |
| 2010/0189534 | A1 * | 7/2010 | Jung | B65G 63/004 414/281 |
| 2010/0232926 | A1 * | 9/2010 | Awad | B65D 85/68 414/802 |
| 2010/0284771 | A1 * | 11/2010 | Stierler | E04H 6/422 414/234 |

* cited by examiner

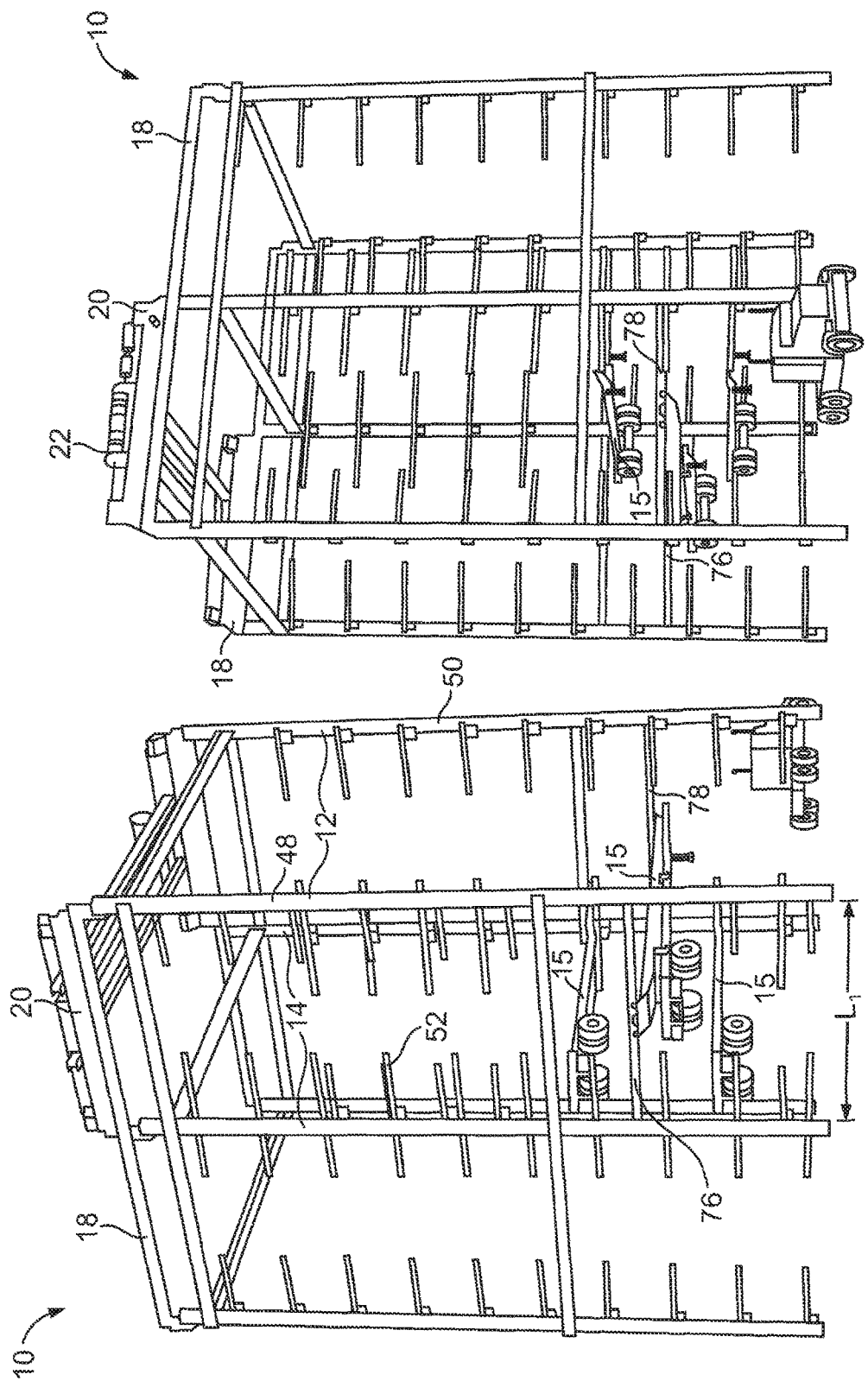

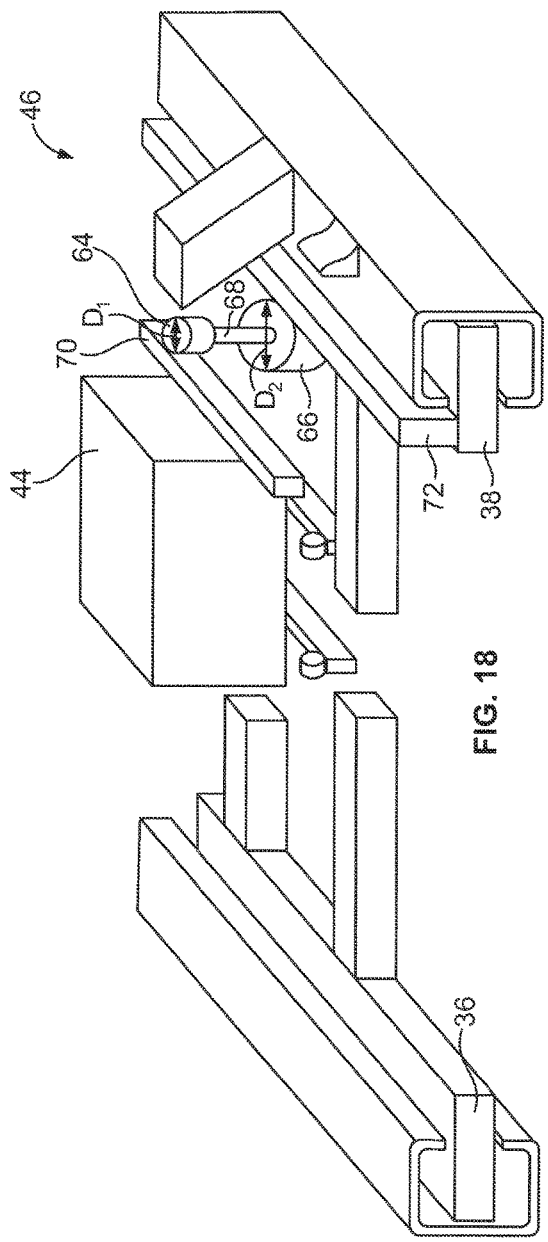
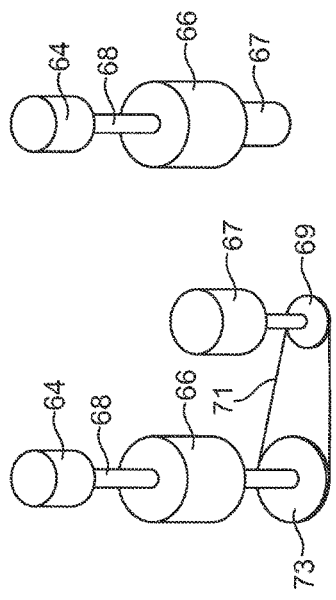
FIG. 18
FIG. 18A
FIG. 18B

CHASSIS STACKER

CROSS-REFERENCE TO RELATED PATENT APPLICATIONS

This patent application is a divisional of U.S. patent application Ser. No. 13/359,119, entitled "Chassis Stacker" filed Jan. 26, 2012, which is a continuation-in-part of U.S. patent application Ser. No. 13/175,526, entitled "System and Method of Handling Chassis" filed Jul. 1, 2011, the disclosures of which are incorporated by reference herein.

FIELD OF THE INVENTION

This invention pertains to a method for storing trailer chassis in general and, in particular, for stacking such trailer chassis.

BACKGROUND OF THE INVENTION

Large container handling facilities such as ports or intermodal rail container yards require the ability to handle large quantities of trailer chassis in order to accept containers that must be transferred from storage stacks or rail cars to trucks for over the road travel to a final destination or, for possible repositioning within the handling facility. The storage and handling of empty chassis is an on-going, time consuming task for the container yard.

In particular, the storage of empty chassis can take up an enormous amount of space. Furthermore, with empty chassis stored over a large area, considerable time is spent in locating and retrieving the empty chassis. Additionally, many facilities store chassis by leaning them against one another is a near vertical orientation. This results in frequent damage to the chassis and high annual repair costs. For these and other reasons, a system for improving the efficiency of the chassis handling task would be an important improvement in the art.

BRIEF SUMMARY OF THE INVENTION

A method for storing an empty trailer chassis includes the step of positioning a trailer chassis between a first and a second vertical storage rack. The method further includes lowering first and second stabilizing beams along the vertical storage racks toward the trailer chassis. The first and second stabilizing-beam trolleys are attached to the respective first and second stabilizing beams and a spreader extends between the first and second stabilizing-beam trolleys. The spreader contains a chassis clamping mechanism that forms a downward-facing portion of the spreader. The chassis clamping mechanism is disposed below the first and second stabilizing beams. The method further includes engaging the trailer chassis with the chassis clamping mechanism. The first and second stabilizing beams are above the trailer chassis when the chassis-clamping mechanism has engaged the trailer chassis. The method further includes raising the first and second stabilizing beams so as to align the trailer chassis with an empty storage space in one of the first and second vertical storage racks. The method further includes traversing the first and second stabilizing-beam trolleys laterally along the respective first and second stabilizing beams such that the spreader is moved laterally between the first and second vertical storage racks so as to align the trailer chassis with the empty storage space. The method further includes lowering the trailer chassis onto a shelf member located in one of the first and second vertical storage racks. The method further includes disengaging the chassis clamping mechanism from the trailer chassis. The method further includes repositioning the spreader between the first and the second vertical storage rack.

BRIEF DESCRIPTION OF THE DRAWINGS

FIG. 1 is a perspective view of multiple chassis storage racks using one embodiment of an elevating structure.

FIG. 2 is a perspective view of multiple chassis storage racks using one embodiment of an elevating structure.

FIG. 18 is a pictorial illustration showing the drive system used on an elevating structure in one embodiment.

FIG. 18A is a view of a motor and drive system used on an elevating structure.

FIG. 18B is a view of the pinions and common shaft used in the drive system on an elevating structure.

DETAILED DESCRIPTION OF THE EMBODIMENTS

Figure 3:
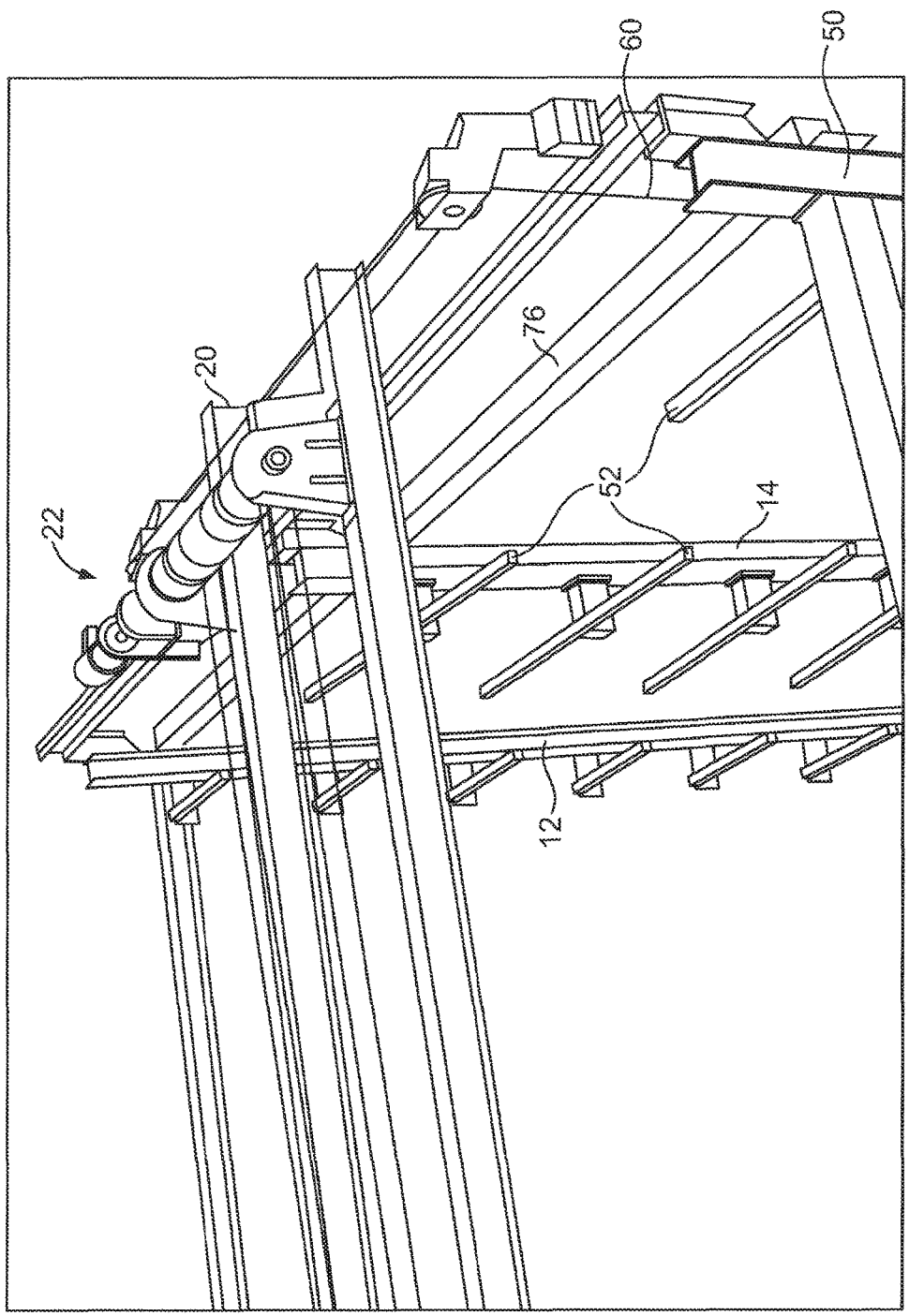
FIG. 3 is a perspective view showing a trolley mounted on a support rail.

The following further illustrate the disclosure but, of course, should not be construed as in any way limiting its scope.

FIGS. 1 and 2, the chassis stacker 10 is comprised of a first and a second vertical storage rack 12, 14. These first and second storage racks 12, 14 are displaced from one another by a first distance $L_1$ wide enough to accommodate a trailer chassis 15, and connected at a top end 16 by a trolley rail support beam 18. A rail-wheel mounted trolley 20 is positioned on the trolley rail support beam 18, as shown in FIGS. 3 and 4.

Figure 4:
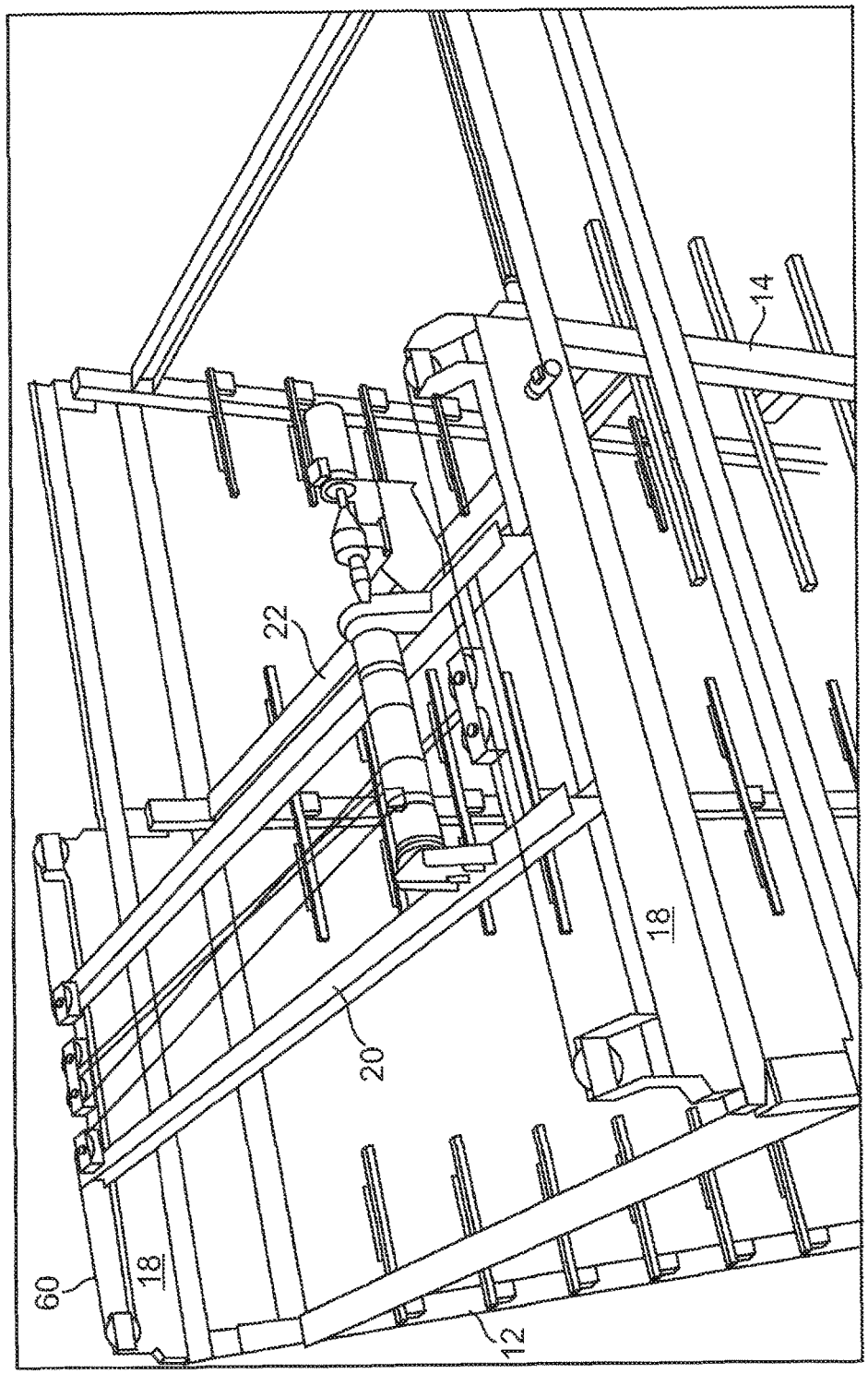
FIG. 4 is a perspective view showing a trolley mounted on a support rail.
Figure 5:
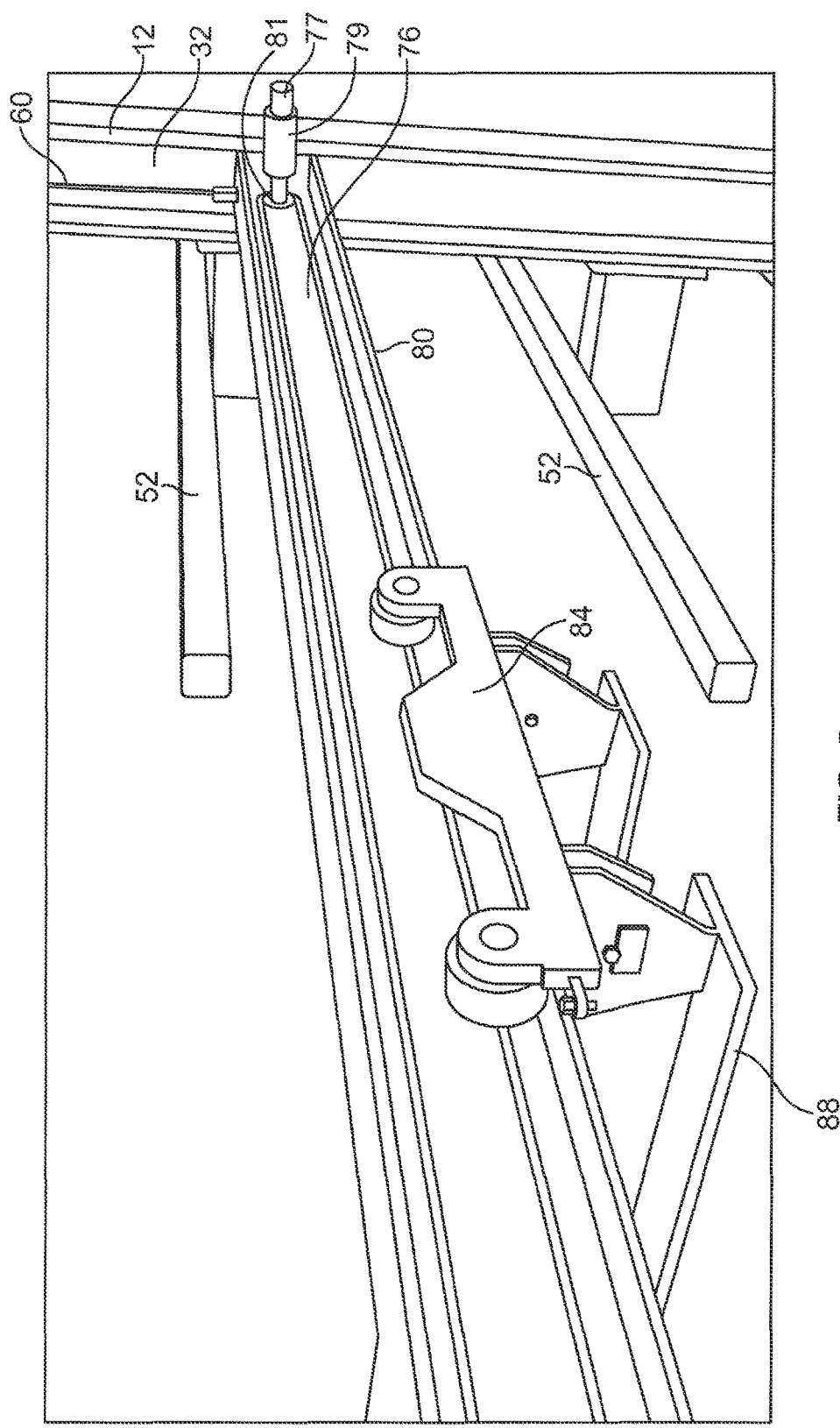
FIG. 5 is a perspective view showing a stabilizing beam trolley and drive system and chain used in one embodiment.
Figure 6:
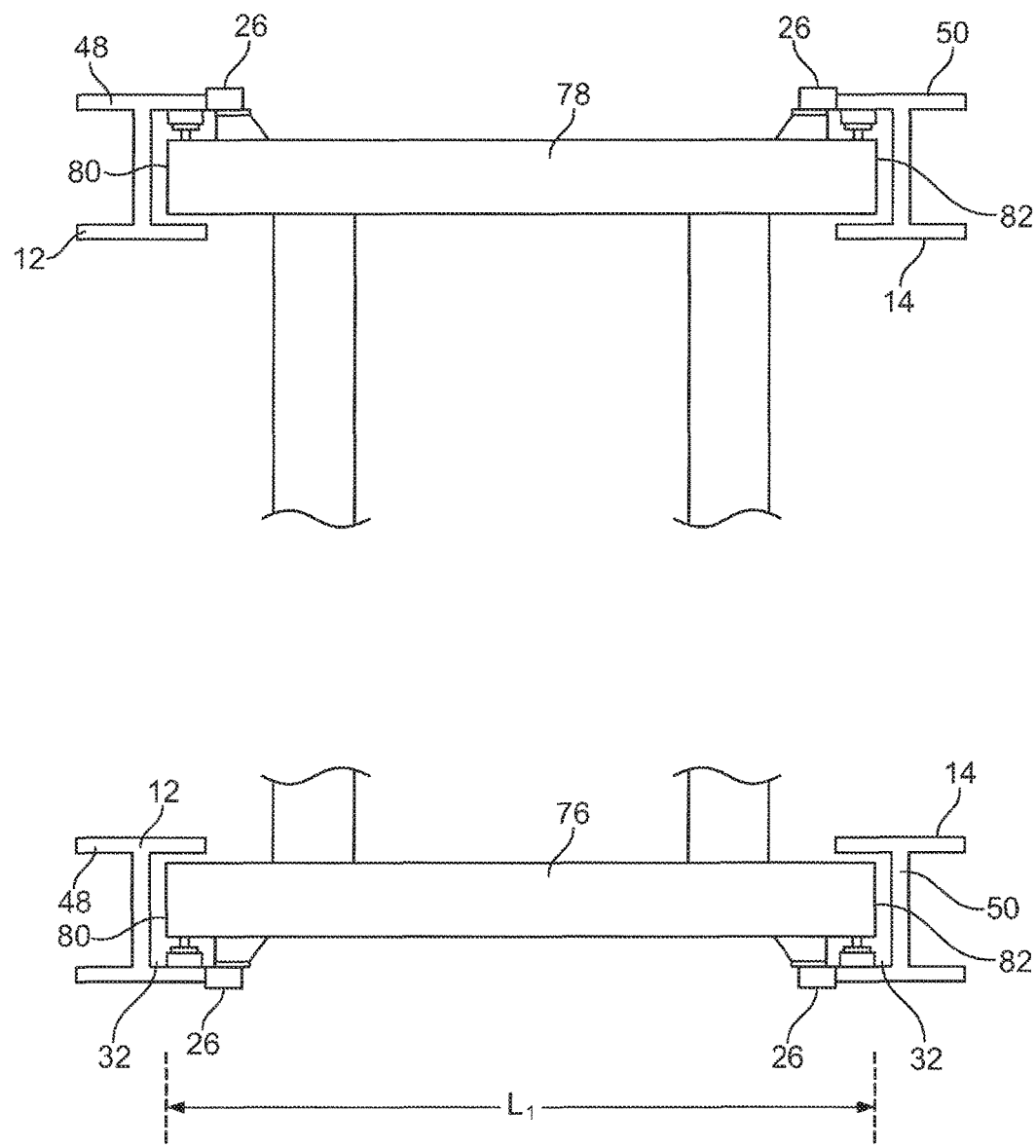
FIG. 6 is a pictorial illustration showing the guide members in contact with the storage racks.

The trolley 20 has an elevation system 22 capable of raising and lowering a first and a second stabilizing beam 76, 78 that are suspended from the trolley 20, as shown in FIGS. 3-5, and guided in their vertical motion by low-friction, storage-rack contact members 26, as shown in FIG. 6, attached at respective first and second ends of each 80, 82 of the stabilizing beams 76, 78. These contact members 26 are in contact with an inner surface 32 of the respective first and second vertical storage racks 12, 14.

Figure 7:
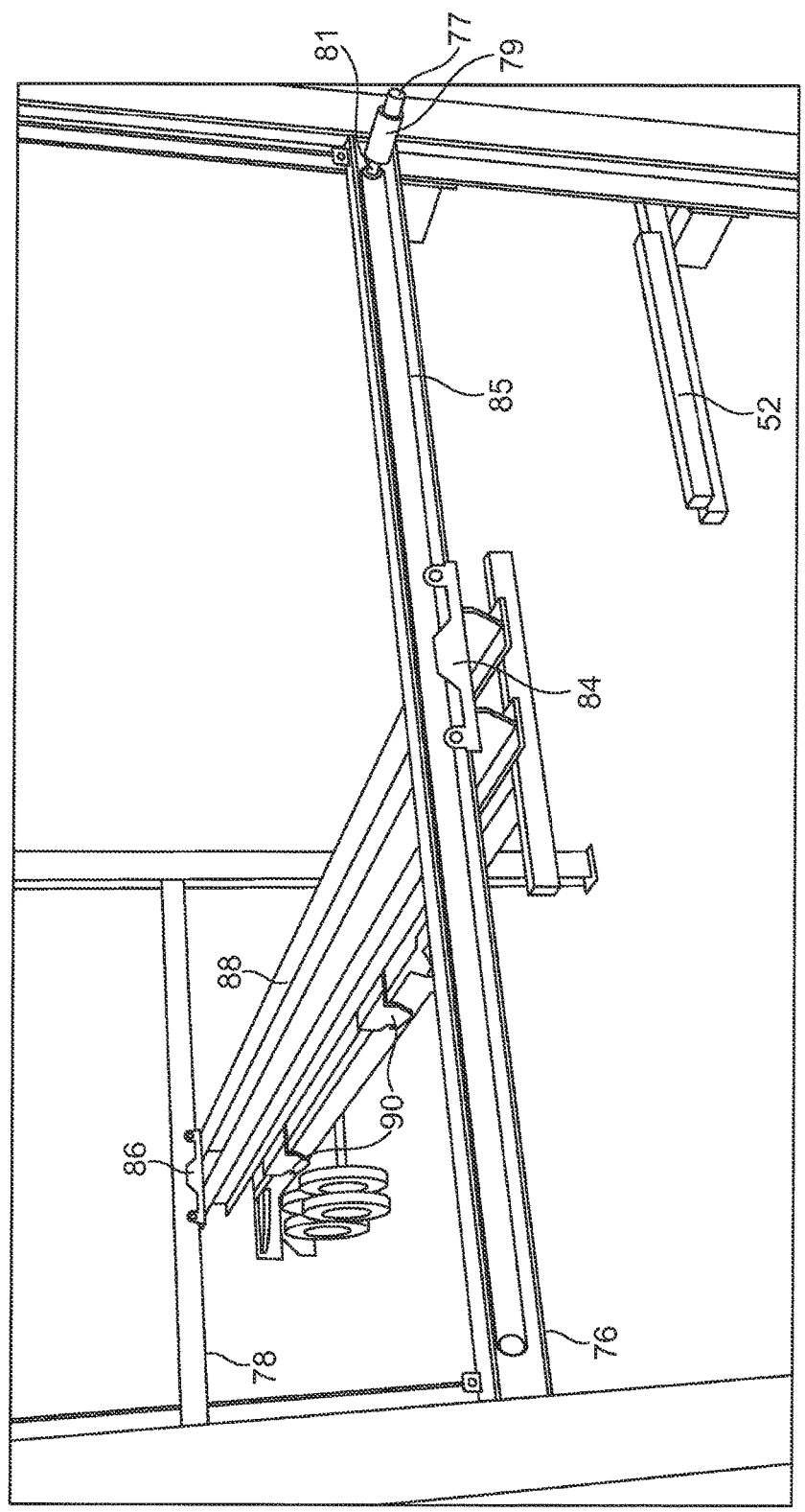
FIG. 7 is a perspective view showing a spreader and stabilizing beam elevating structure used in one embodiment.

A first and a second stabilizing-beam trolley 84, 86, as shown in FIG. 7 is attached to the, respective, first and second stabilizing beams 76, 78, while a spreader 88 containing a chassis-clamping mechanism 90 extends between and attaches to the first and the second stabilizing beam trolley 84, 86, as shown in FIG. 7. A drive system such as a drive chain 85 is used to move the stabilizing beam trolley 84, 86 along the stabilizing beam 76, 78. As shown in FIGS. 5 and 7, the chain may be driven by a gearbox 79 which is driven by an electric or hydraulic motor 77, which drives a chain sprocket 81. The stabilizing beam trolleys, 84, 86 may also be self propelled by a motor and gearbox driving the trolley wheels.

Figure 8:
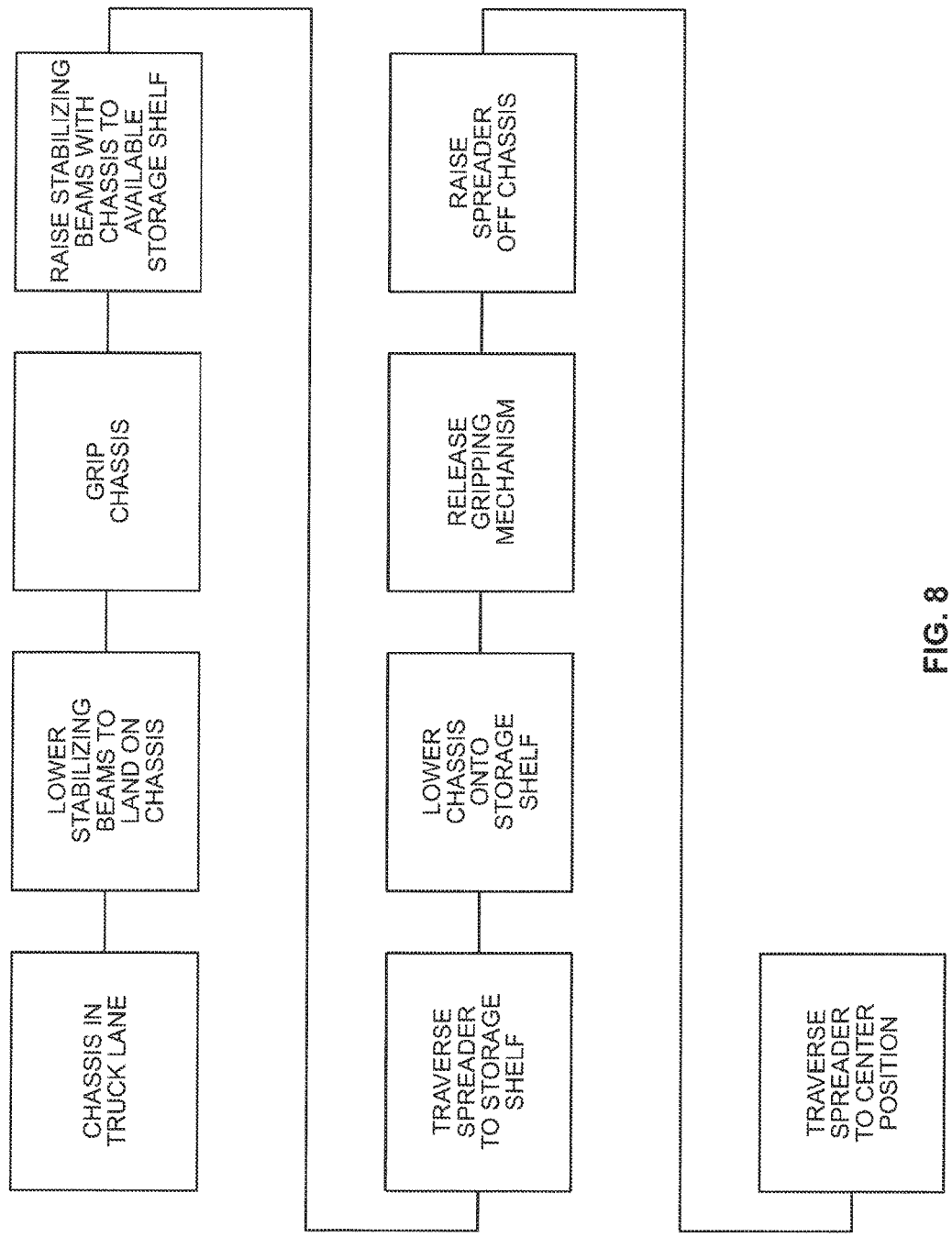
FIG. 8 is a flow chart showing the steps associated with storing a chassis on a storage rack in one of the embodiments.
Figure 21:
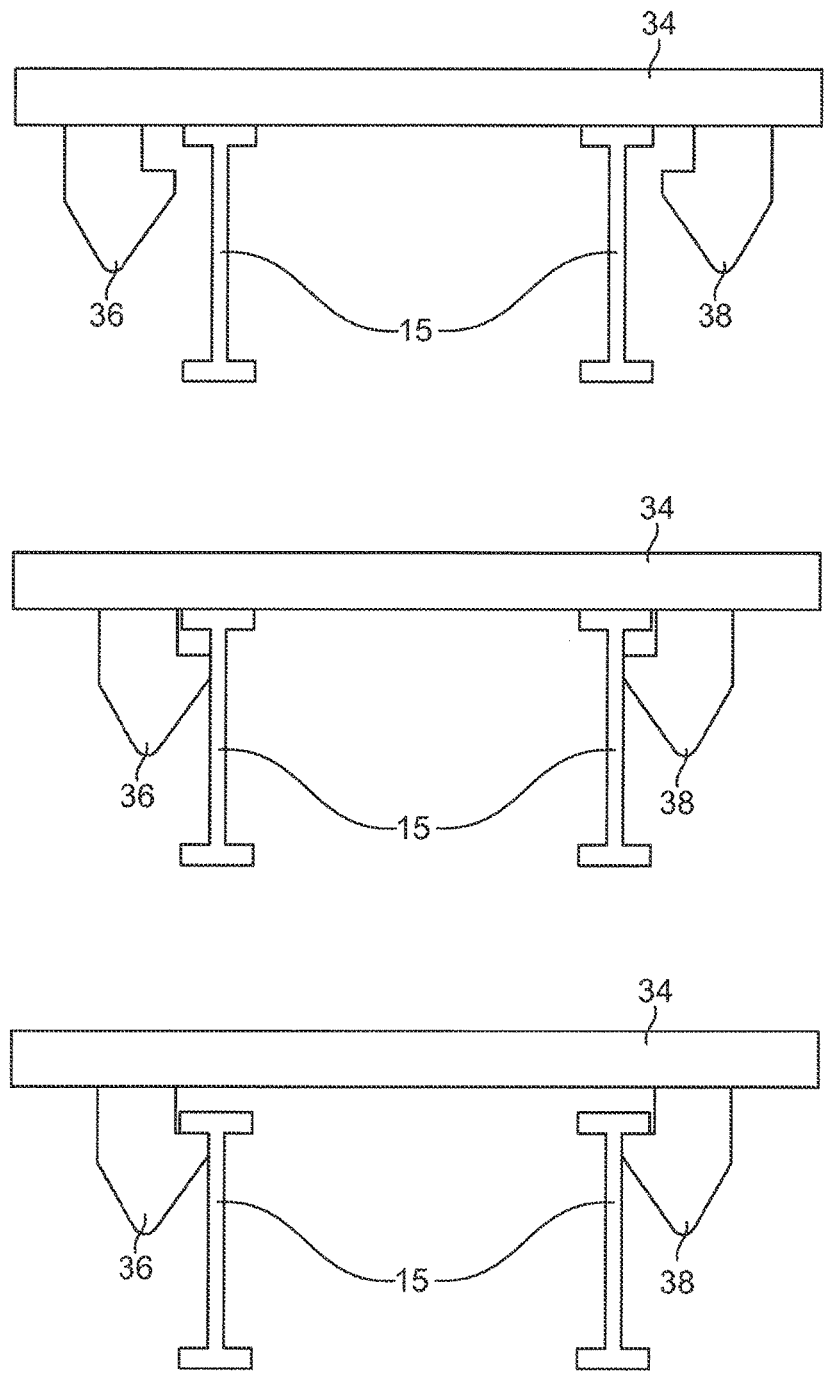
FIG. 21 is a pictorial representation showing the steps in which the chassis contact members contact a chassis.

FIG. 8 shows a flow chart that describes what happens when using this embodiment to store an empty trailer chassis 15. A trailer chassis 15 is positioned between the first and a second vertical storage rack 12, 14. An operator then lowers on to the chassis 15 the first and second stabilizing beams 76, 78 which support a spreader 88 containing a chassis clamping mechanism 90. The chassis clamping mechanism 90 is then engaged with the chassis 15. Once the chassis 15 is securely engaged with the chassis clamping mechanism 90, the first and the second stabilizing beams 76, 78 are raised so as to align the chassis 15 with an empty storage space in one of the first and second vertical storage racks 12, 14. The spreader 88 is then traversed along the first and second stabilizing beams 76, 78, through the use of the first and second stabilizing beam trolley 84, 86 so as to align the chassis 15 with the empty storage space. The chassis 15 is then lowered on to a chassis support member 52 located in one of the first and second vertical storage racks 12, 14. Once the chassis 15 is securely positioned on the chassis support member 52, the chassis 15 is disengaged from the chassis clamping mechanism 90 and the spreader 88 is repositioned between the first and the second vertical storage rack 12, 14. The method of clamping the chassis is as shown in FIG. 21.

Figure 9:
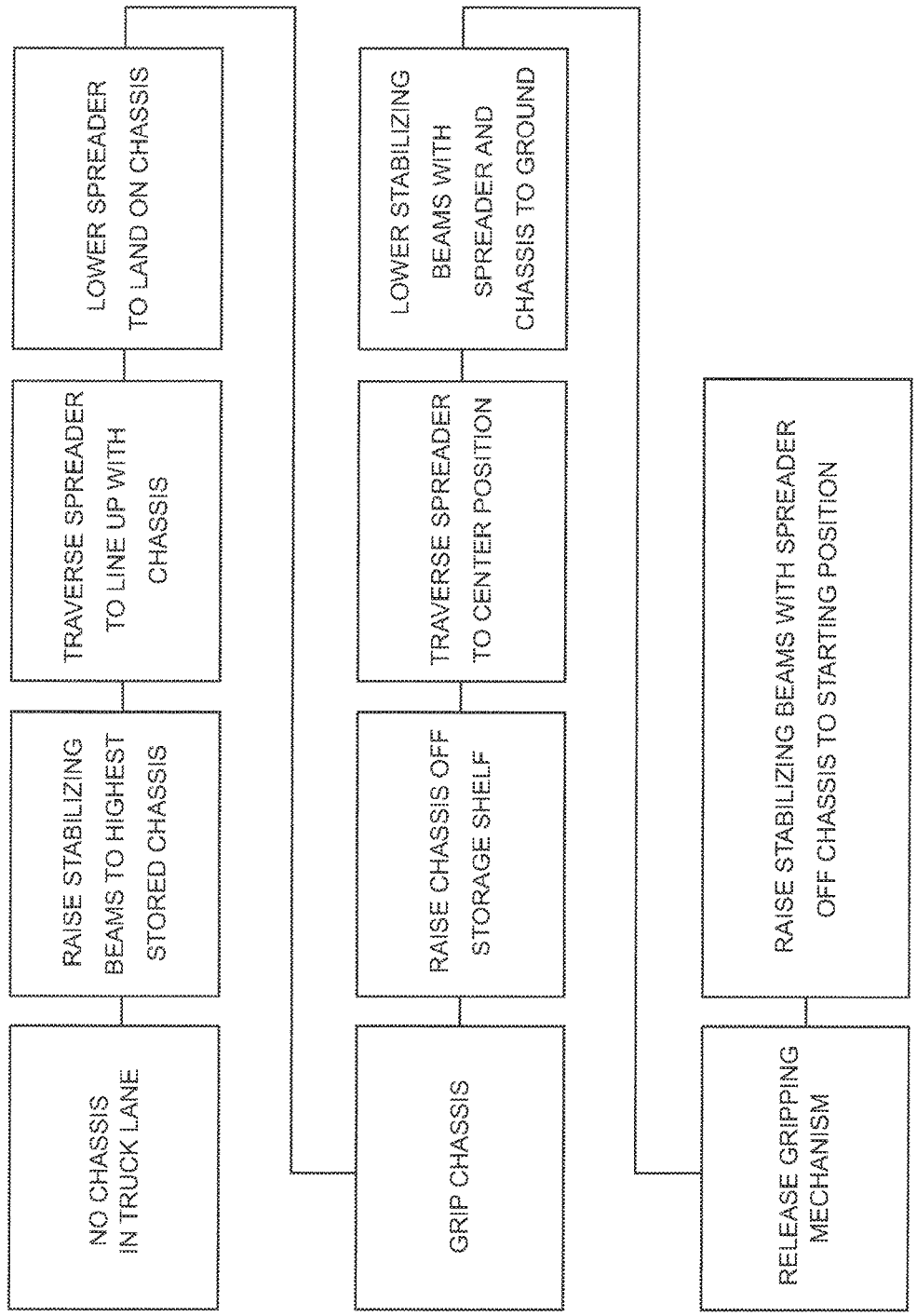
FIG. 9 is a flow chart showing the steps associated with retrieving a chassis on a storage rack in one of the embodiments.

FIG. 9 shows the process of retrieving an empty chassis 15 from a storage rack 12 using the stabilizing beam embodiment. During operation of this embodiment, the stabilizing beams 76, 78 are raised to the highest stored chassis 15. The traverse spreader 88 is then lined up with the chassis 15 to be retrieved. Once aligned, the spreader 88 is lowered onto the chassis 15 where the chassis-clamping mechanism 90 then grips the chassis 15. Once the chassis 15 is securely gripped, the chassis 15 is raised off of the chassis support member 52 and the spreader 88 is moved to center position between the two storage racks, 12 and 14. After the spreader 88 is centered, the stabilizing beams 76, 78 and the spreader 88 are lowered along with the chassis 15 to the ground. When the chassis 15 is safely on the ground, the chassis-clamping mechanism 90 is released and the stabilizing beams 76, 78 and spreader 88 are raised to an elevated position, clear of the chassis 15 on the ground.

Figure 10:
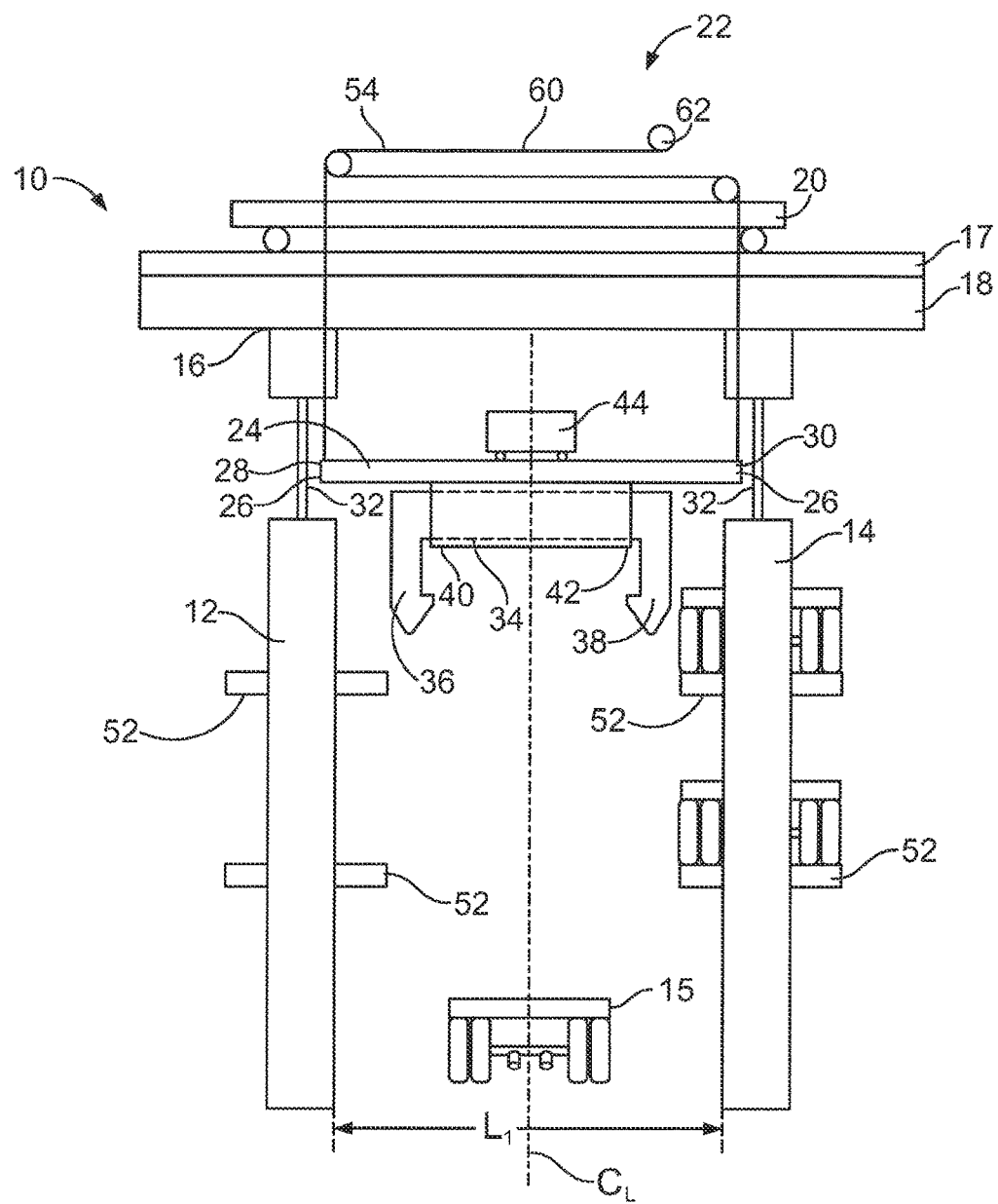
FIG. 10 is a pictorial illustration of an end of the two chassis storage racks and a truck lane.
Figure 11:
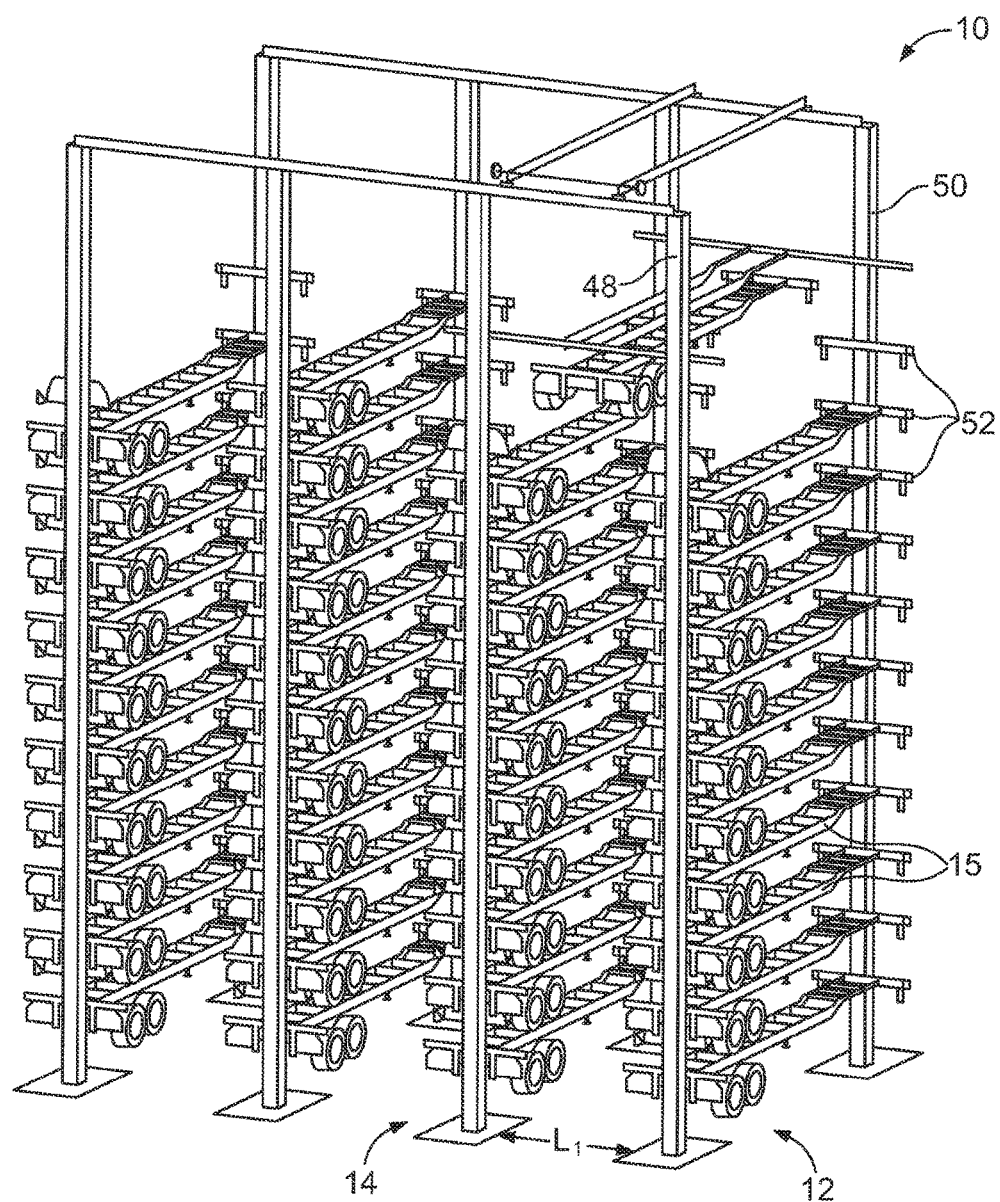
FIG. 11 is a perspective view showing multiple chassis storage racks and a truck lane.

In another embodiment, as shown in FIGS. 10 and 11, a chassis stacker 10 comprised of a first and a second vertical storage rack 12, 14 that are displaced from one another by a first distance $L_1$ that is wide enough to accommodate a trailer chassis 15. The storage racks 12, 14 are connected at a top end 16 by a trolley rail support beam 18. A trolley 20 is positioned on the trolley rail support beam 18. In an embodiment, the trolley 20 is a rail-wheel mounted trolley 20, as shown in FIG. 10.

Figure 12:
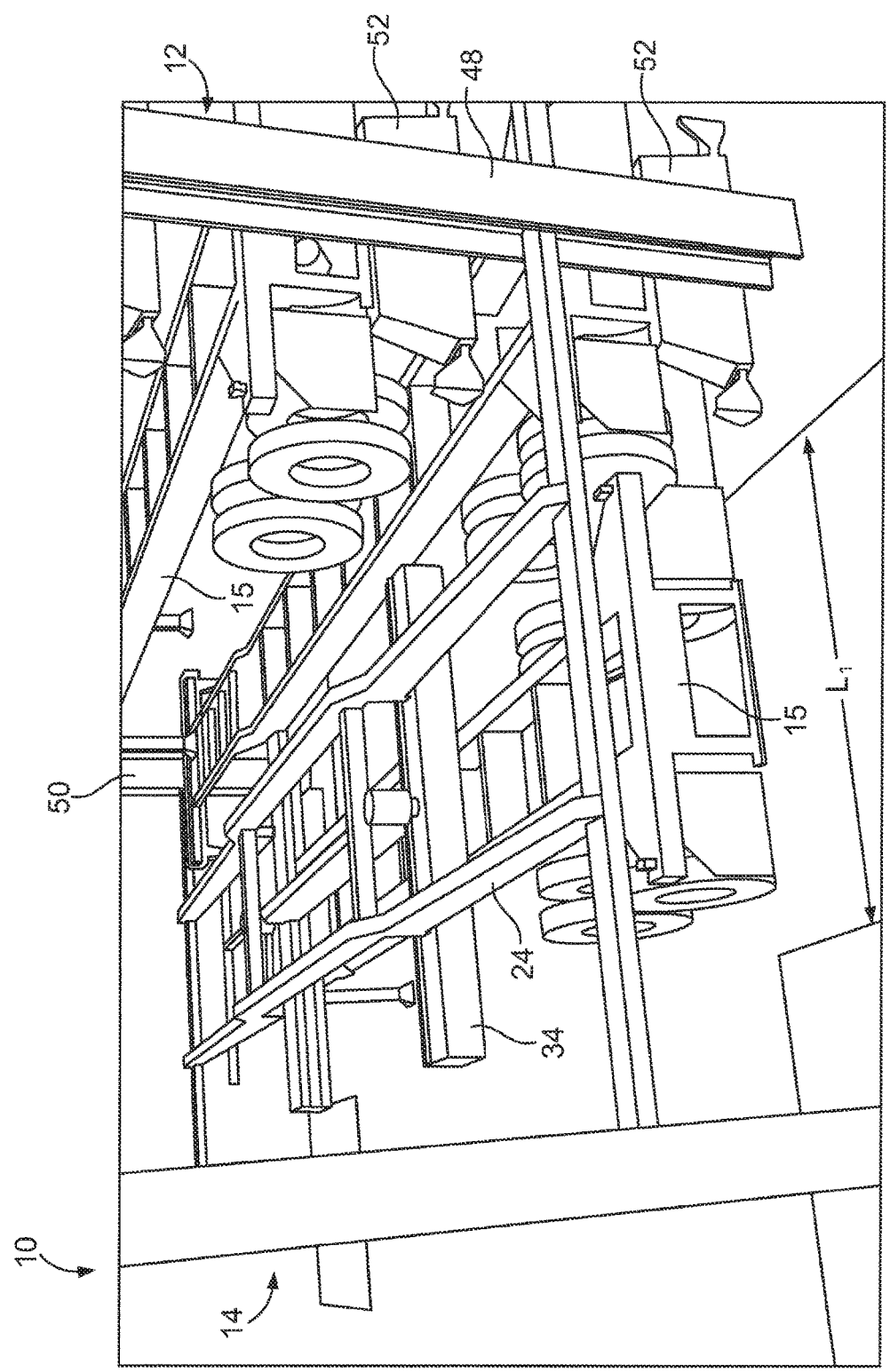
FIG. 12 is a perspective view showing the chassis gripping member, used in one embodiment, attached to a chassis on the ground.
Figure 13:
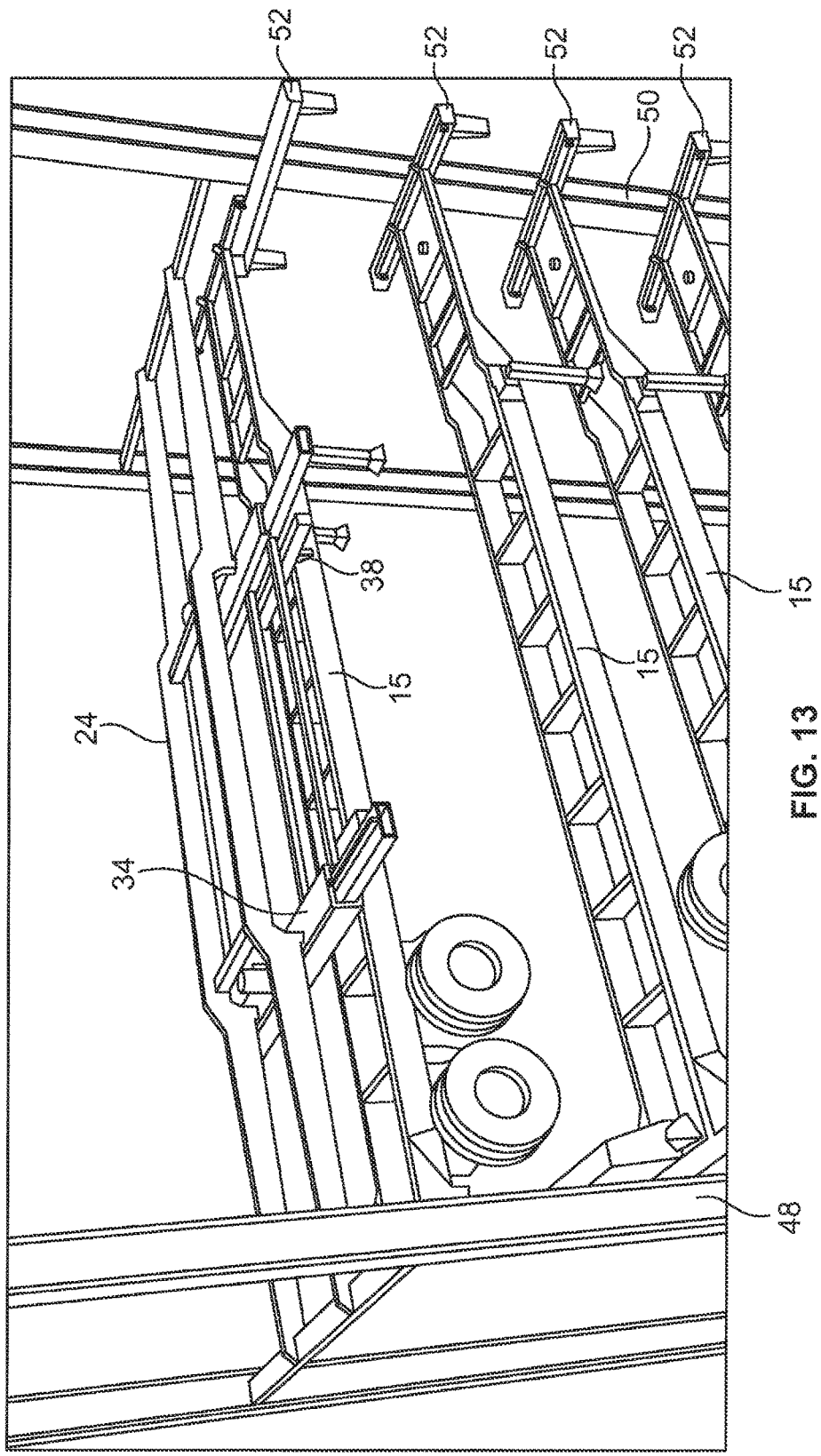
FIG. 13 is a perspective view showing the chassis gripping member, used in one embodiment, elevating a chassis to a respective storage location.
Figure 14:
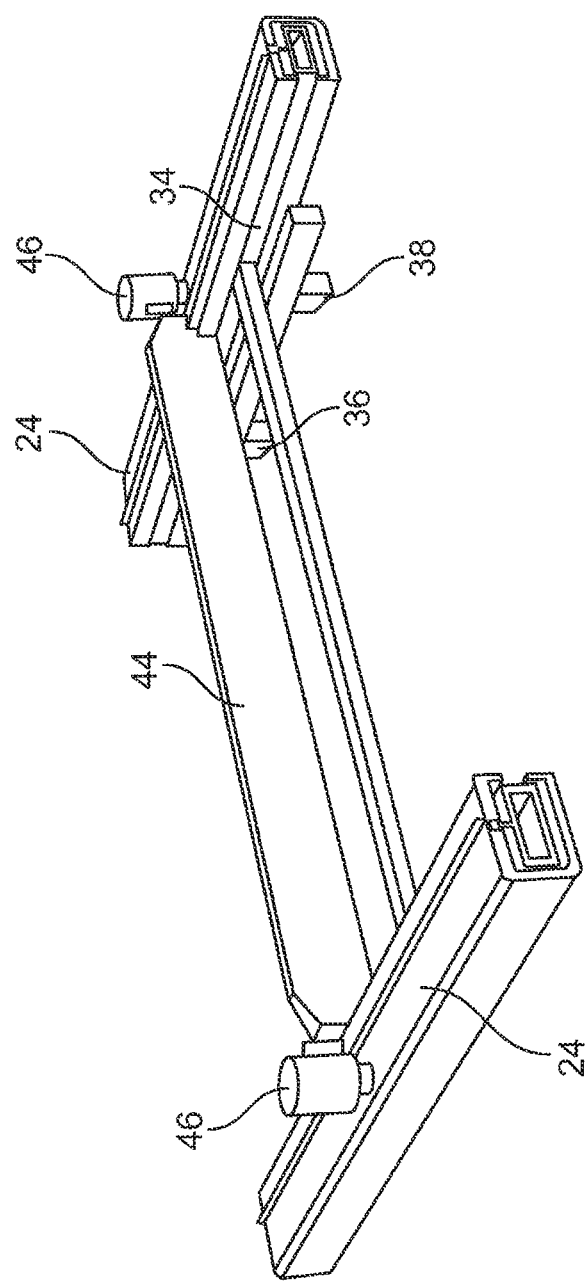
FIG. 14 is a perspective view showing the elevating structure with the chassis gripping device used in one embodiment in a retracted position.
Figure 15:
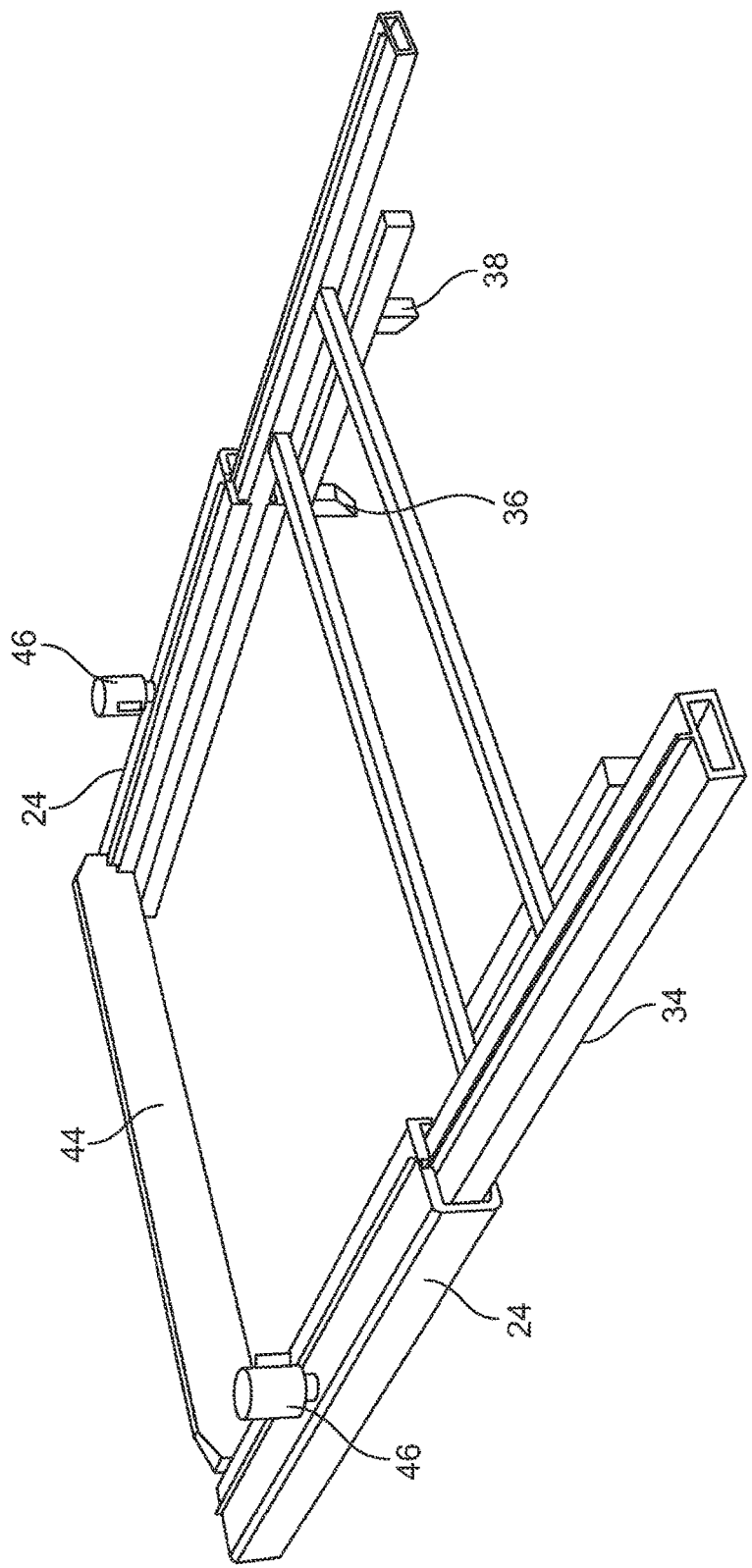
FIG. 15 is a perspective view showing the elevating structure with the chassis gripping device used in one embodiment in an extended position.

The trolley 20 has an elevation system 22 that is capable of raising and lowering an elevating structure 24 that is suspended from the trolley 20 and guided in its vertical motion by low-friction, storage-rack contact members 26 that are attached at respective first and second ends of the elevating structure, as shown in FIG. 6. These contact members 26 are in contact with an inner surface 32 of the respective first and second vertical storage racks 12, 14. As shown in FIGS. 12-13, a chassis gripping device 34 is attached to the elevating structure 24 opposite the trolley rail 17. As shown in FIGS. 10, 14 and 15, chassis gripping device 34 includes first and second chassis contact members 36, 38 that are telescopingly attached to the elevating structure 24. A movable counter weight 44 is attached to the elevating structure 24 opposite the chassis gripping device 34 and proximal to the trolley rail 17, while a drive system 46 is used to power the chassis gripping device 34 and the movable counter weight 44.

In an embodiment, the first and second storage racks 12, 14 are separated by a first distance $L_1$ of no less than 16 feet.

The low-friction, storage-rack contact members 26 can be slide pads, rollers, or any suitable material or mechanism without departing from the spirit and scope of the invention.

Figure 16:
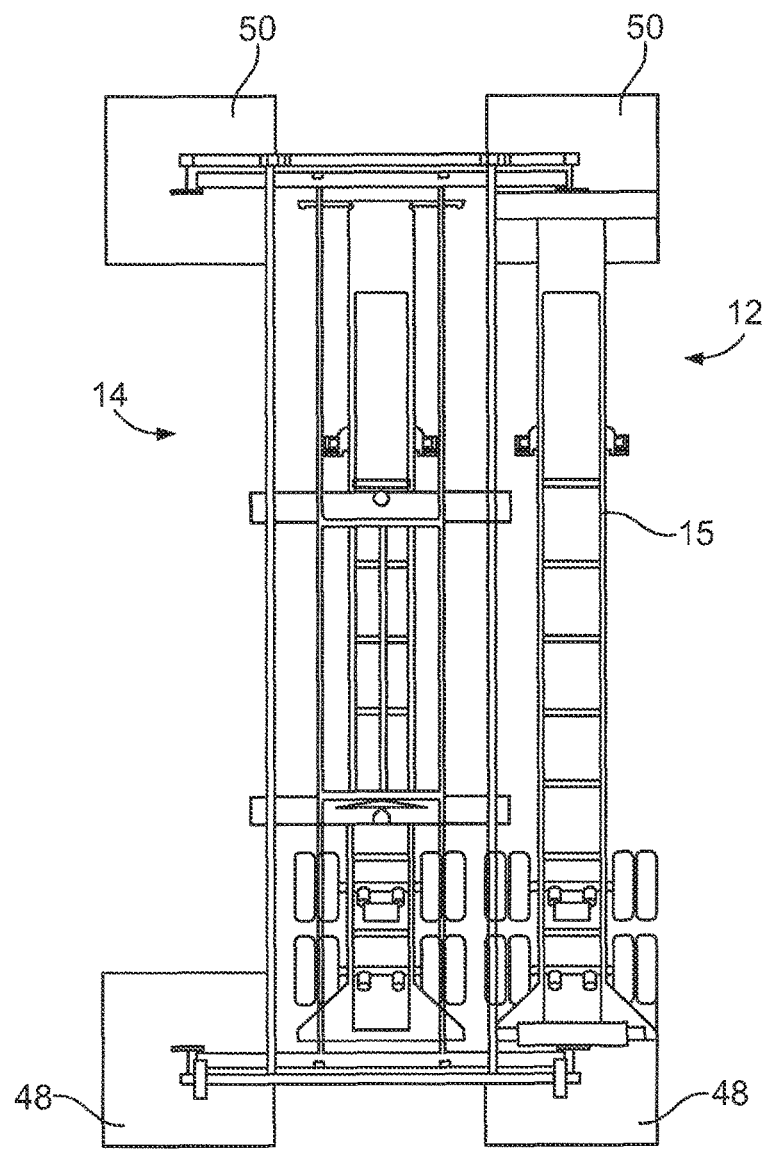
FIG. 16 is an overhead view of the chassis stacker.

In an embodiment, each of the vertical storage racks 12, 14 is comprised of a first and a second vertical column 48, 50 displaced from one another, as shown in FIG. 16. Each one of said columns 48, 50 has a plurality of chassis support members 52 displaced vertically from one another and aligned with an opposing chassis support member 52 on the opposite column. In an embodiment, these chassis support members 52 are shelves, as shown in FIGS. 10 and 11.

Figure 17:
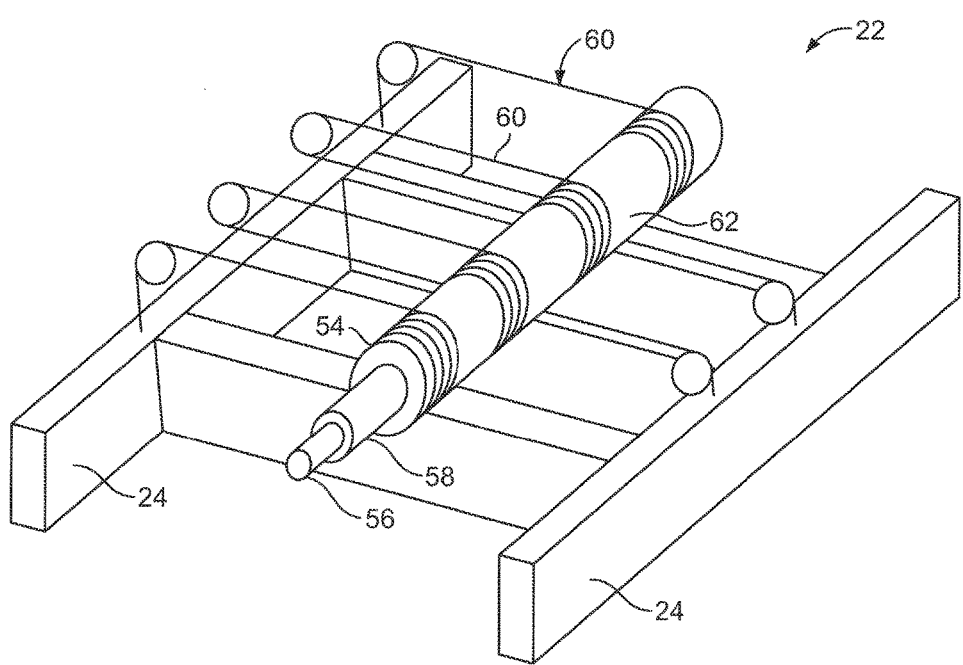
FIG. 17 is a pictorial illustration of an elevation system used in one embodiment.
Figure 24:
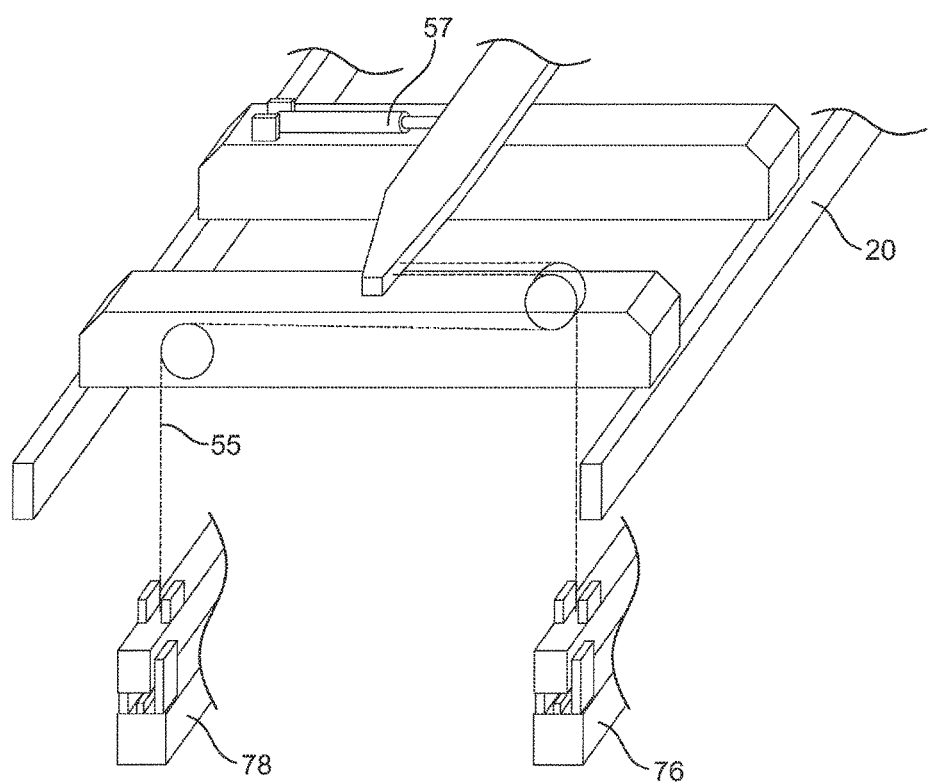
FIG. 24 is perspective view showing an embodiment of a hoist system using a chain attached to a cylinder.
Figure 25:
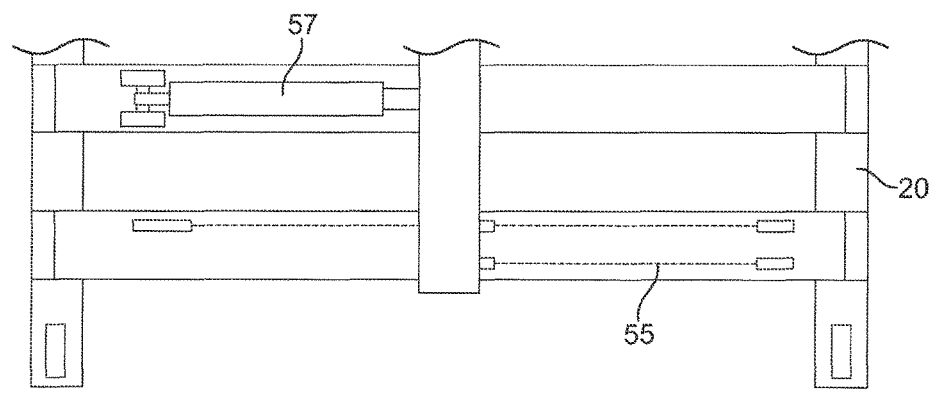
FIG. 25 is a top view of a chassis stacker utilizing an embodiment of a hoist system using a chain attached to a cylinder.
Figure 26:
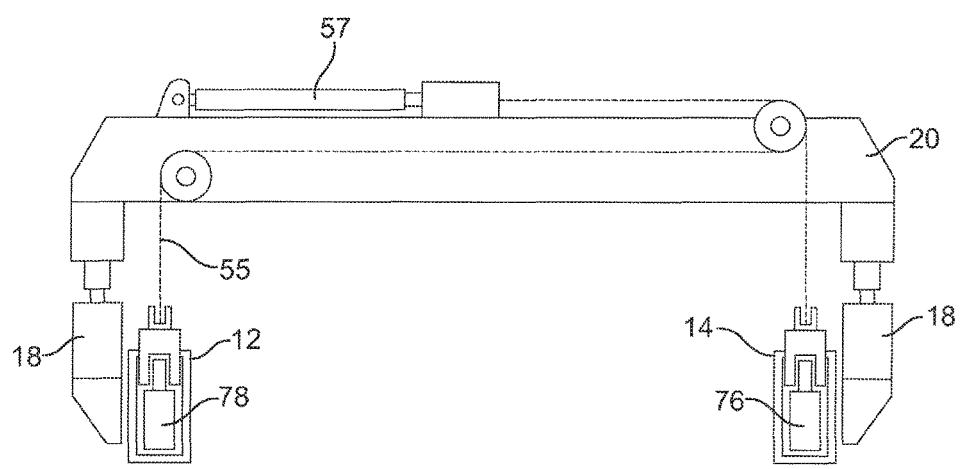
FIG. 26 is a side view of a chassis stacker utilizing an embodiment of a hoist system using a chain attached to a cylinder.

In an embodiment, as shown in FIG. 17, the elevation system 22 includes a hoist system 54, and a motor 56 that powers a gearbox 58 that drives the hoist system 54. In a more particular embodiment, the hoist system 54 includes a wire rope 60 wrapped around a hoist drum 62, as shown in FIG. 17. In still another embodiment, the hoist system 54 includes a chain 55 attached to a cylinder 57, as shown in FIGS. 24-26. In yet another embodiment, the hoist system 54 includes a vertical rack and pinion.

In an embodiment, the counterweight 44 has a first weight, the telescoping structure and trailer chassis 15 combined have a second weight that is less than the first weight.

Figure 18C:
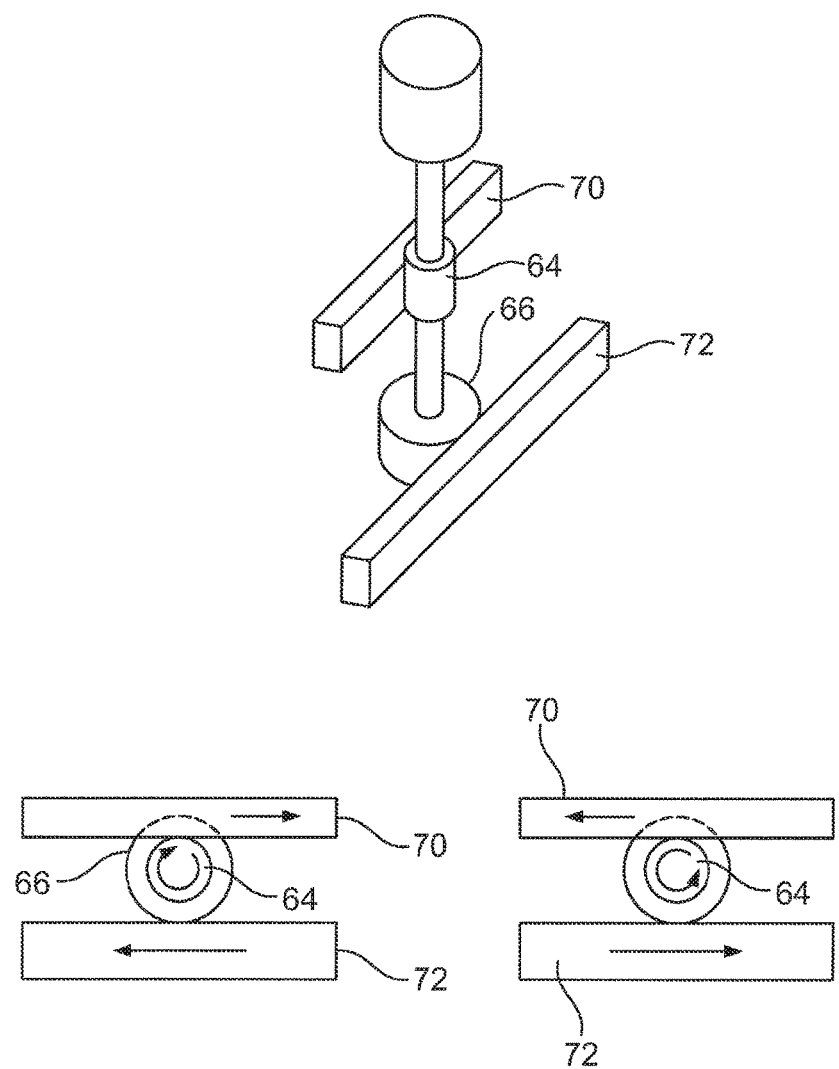
FIG. 18C is a perspective showing a rack and pinion drive system

In an embodiment, as shown in FIG. 18 and FIGS. 18A-C, the drive system 46 is a rack and pinion system that is comprised of a first pinion 64 having a first diameter $D_1$, a second pinion 66 having a second diameter $D_2$ that is greater than the first diameter $D_1$ is mounted on a common shaft 68 with the first pinion 64. In an embodiment as shown in FIG. 18A, motor 67 turns a first drive sprocket 69 which causes a chain 71 to turn a second drive sprocket 73. The turning of the second drive sprocket 73 rotates a shaft 68 which causes pinions 66 and 64 to rotate. A first rack 70 is mounted on the counterweight 44 so as to mesh with the first pinion 64, while a second rack 72 is mounted on the chassis contact member and meshes with the second pinion 66, as shown in FIG. 18C. In such an embodiment, when the common drive shaft 68 rotates in a given direction, the first rack 70 moves in a first direction, and the second rack 72 moves in a second direction opposite the first direction. In another embodiment, as shown in FIG. 18B, a motor 67 directly turns a common shaft 68, thereby causing pinions 64 and 68 to rotate.

The drive system 46 can be powered in various ways including hydraulically or electrically. The drive system 46 may also be comprised of a roller and chain.

Figure 19:
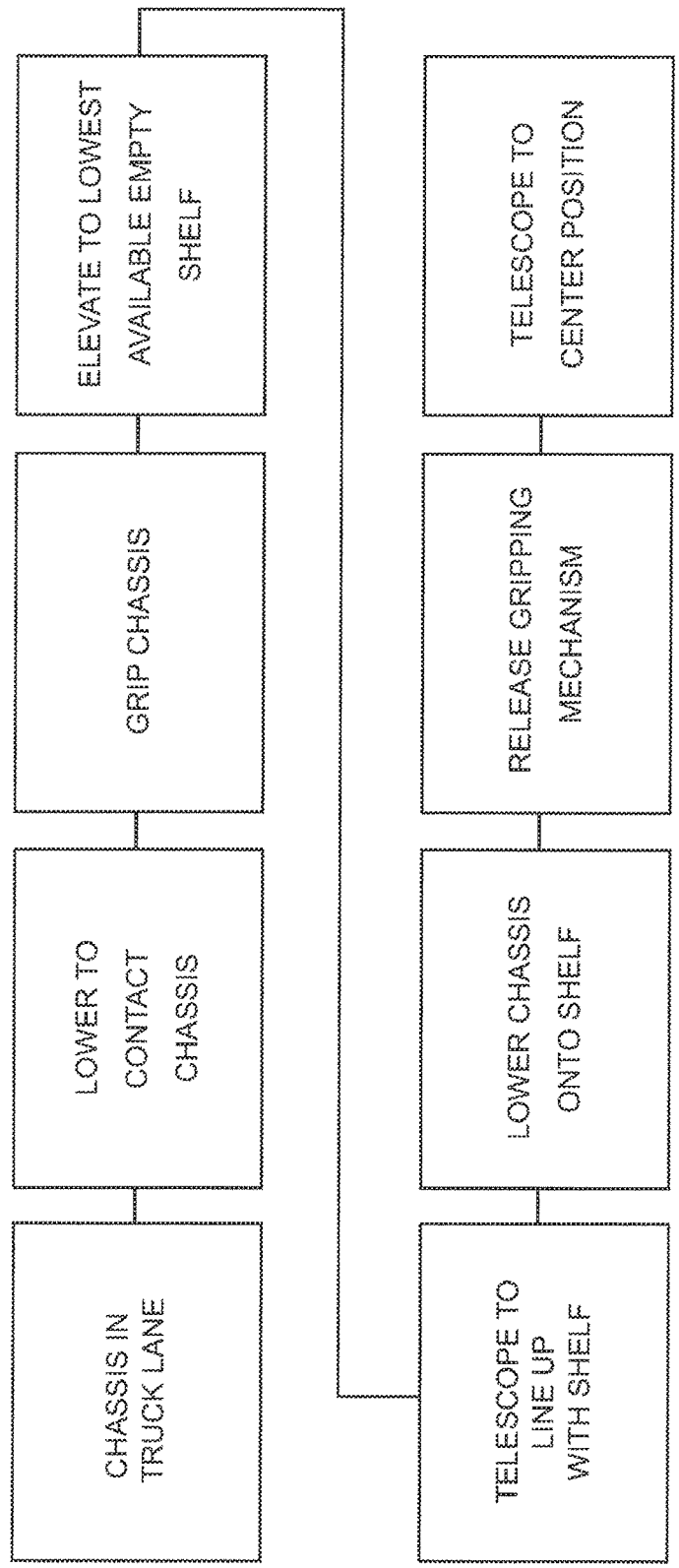
FIG. 19 is a flow chart showing the steps associated with storing a chassis on a storage rack in one of the embodiments.
Figure 20:
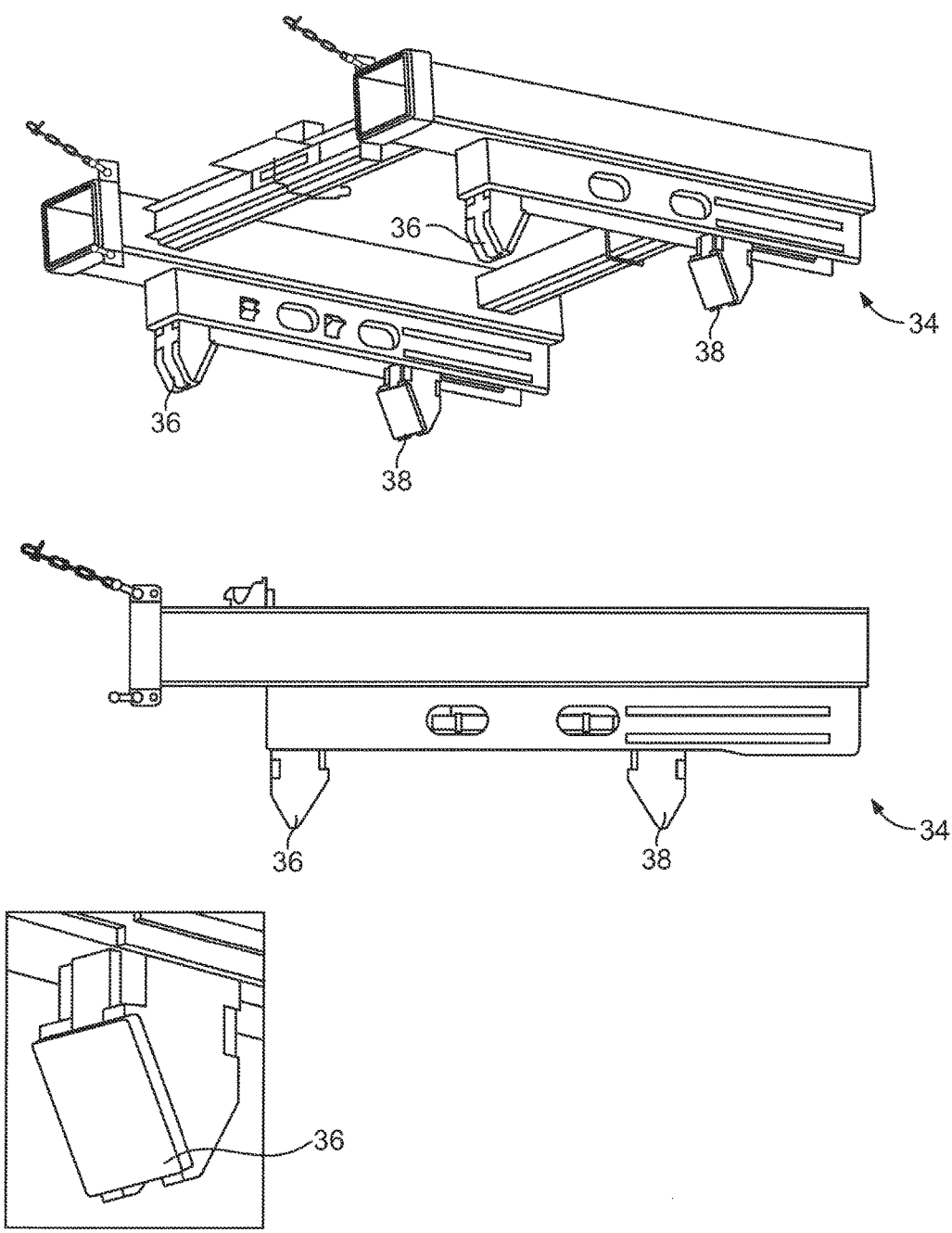
FIG. 20 is a pictorial illustration of a chassis gripping device and chassis contact members used in one embodiment.
Figure 22:
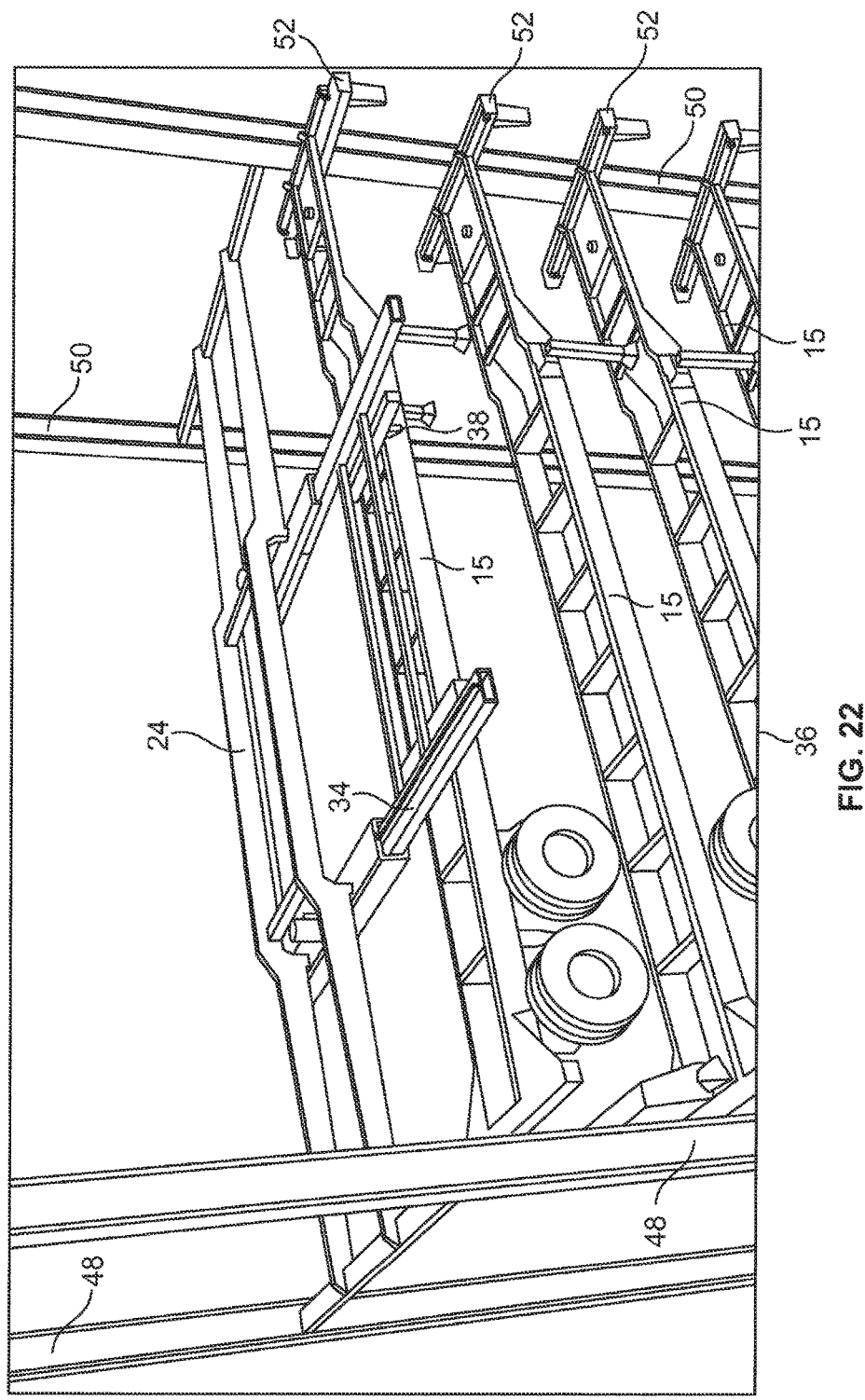
FIG. 22 is a perspective view showing the chassis being telescoped into place on the storage rack.

FIG. 19 shows a flow chart that describes what happens when the chassis stacker is in operation. As shown in FIG. 10, a trailer chassis 15 is positioned between a first and a second vertical storage rack 12, 14. An elevating structure 24 having a chassis gripping device 34 is then lowered to the chassis where the chassis contact members 36, 38, as shown in FIGS. 14, 15, 20 and 21 engage the chassis 15, as shown in FIG. 13. After the chassis 15 is securely engaged, the elevating structure 24 raises the chassis gripping device 34 and the chassis 15 so as to align the chassis 15 with an empty storage space in one of the first and second vertical storage racks 12, 14, as shown in FIG. 12. Once aligned with the empty storage space, the chassis gripping device 34 extends the chassis 15, as shown in FIGS. 13 and 22, into one of the first and second vertical storage racks 12, 14 where the elevating structure 24 then lowers the chassis 15 on to chassis support members 52 located in one of the first and second vertical storage racks 12, 14. After the chassis 15 is positioned on the chassis support members 52, it is disengaged from the chassis gripping device 34 which is then repositioned between the first and the second vertical storage racks 12, 14.

Figure 23:
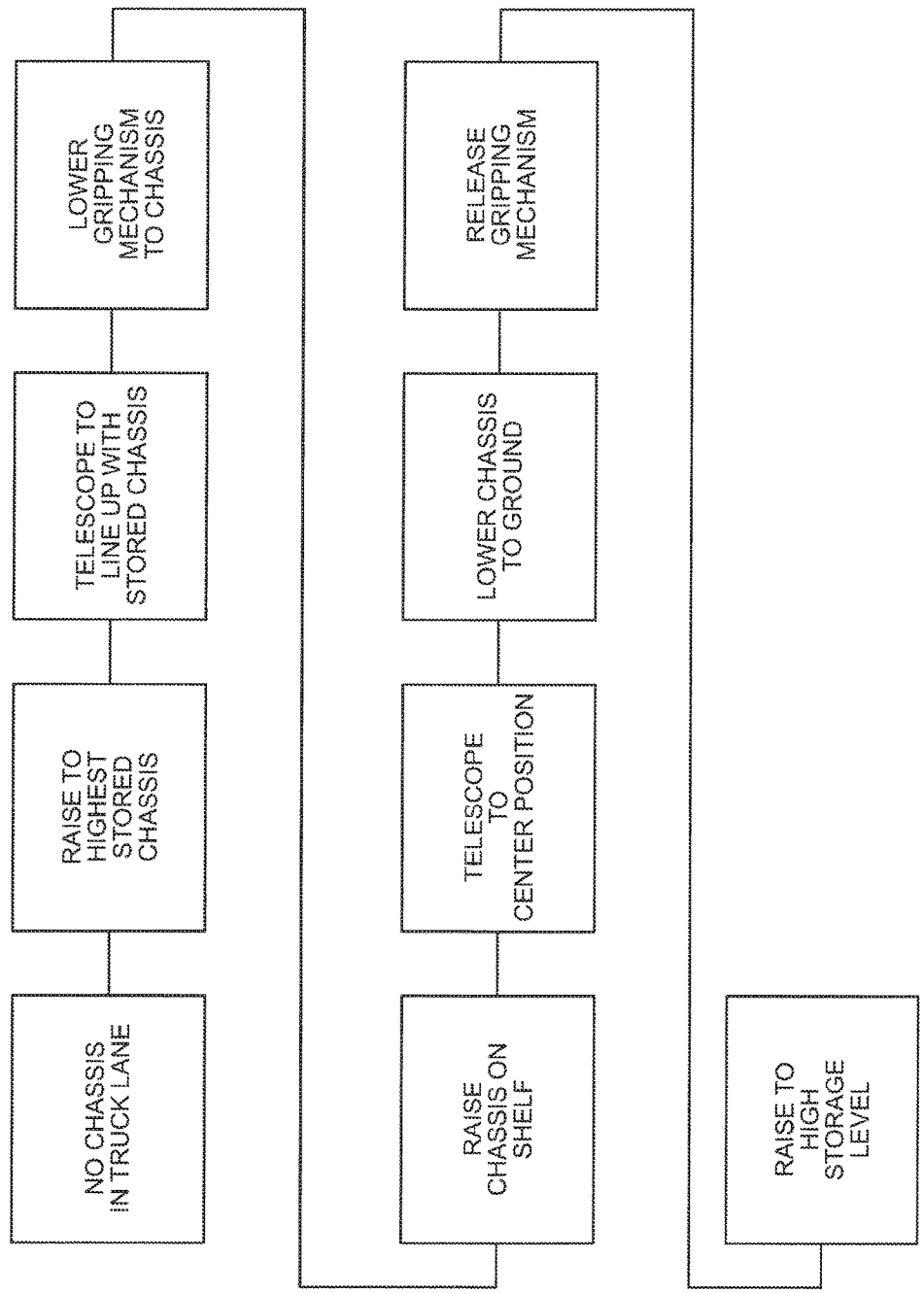
FIG. 23 is a flow chart showing the steps associated with retrieving a chassis on a storage rack in one of the embodiments.

FIG. 23 shows the process of retrieving an empty chassis 15 that is already stored in a storage rack 12. During such an operation, the elevating structure 24 is raised to the highest stored chassis 15. Once aligned, the chassis gripping device 34 is extended to line up with the empty chassis 15. The chassis gripping device 34 is then lowered to the chassis 15 and the chassis contact members 36, 38 grip the chassis 15. Once the chassis has been securely gripped by the chassis contact members 36, 38 the chassis 15 is raised off of the chassis support members 52 and the chassis gripping device 34 is retracted to the center position where the chassis 15 is then lowered to the ground. Once the chassis 15 is on the ground, the chassis contact members 36, 38 are released from the chassis 15 and the chassis gripping mechanism 34 is raised to a high storage level.

Although FIGS. 8, 9, 19 and 23 show storing a chassis on the lowest available shelf and retrieving from the highest occupied shelf, the system could also be configured to store and retrieve from a specified location without departing from the scope and intent of the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method for storing an empty trailer chassis, the method comprised of the steps of:

positioning a trailer chassis between a first and a second vertical storage rack;

lowering first and second stabilizing beams along the vertical storage racks toward the trailer chassis, wherein first and second stabilizing-beam trolleys are attached to the respective first and second stabilizing beams, wherein a spreader extends between the first and second stabilizing-beam trolleys, the spreader containing a chassis clamping mechanism that forms a downward-facing portion of the spreader, the chassis clamping mechanism being disposed below the first and second stabilizing beams;

engaging the trailer chassis with the chassis clamping mechanism, the first and second stabilizing beams being above the trailer chassis when the chassis-clamping mechanism has engaged the trailer chassis;

raising the first and second stabilizing beams so as to align the trailer chassis with an empty storage space in one of the first and second vertical storage racks;

traversing the first and second stabilizing-beam trolleys laterally along the respective first and second stabilizing beams such that the spreader is moved laterally between the first and second vertical storage racks so as to align the trailer chassis with the empty storage space;

lowering the trailer chassis onto a shelf member located in one of the first and second vertical storage racks;

disengaging the chassis clamping mechanism from the trailer chassis; and repositioning the spreader between the first and the second vertical storage rack.

2. The method of claim 1, wherein the step of repositioning the spreader further comprises traversing the first and second stabilizing-beam trolleys laterally along the respective first and second stabilizing beams such that the spreader is moved laterally between the first and second vertical storage racks.

3. The method of claim 1, wherein a distance between the first and second vertical storage racks is no less than 16 feet.

4. The method of claim 1, wherein the step of lowering the first and second stabilizing beams further comprises guiding the first and second stabilizing beams in their vertical motion by low-friction, storage-rack contact members.

5. The method of claim 4, wherein the low-friction, storage-rack contact members are slide pads.

6. The method of claim 4, wherein the low-friction, storage-rack contact members are rollers.

7. The method of claim 1, wherein the first and second vertical storage racks are connected at a top end by a support beam.

8. The method of claim 7, the method further comprising:

positioning a lifting trolley on the support beam, the lifting trolley having an elevation system;

lowering, by the elevation system, the first and second stabilizing beams; and raising, by the elevation system, the first and second stabilizing beams.

9. The method of claim 8, the method further comprising providing the elevation system with a hoist system and a motor that powers a gearbox that drives the hoist system.

10. The method of claim 9, the method further comprising wrapping a wire rope around a hoist drum of the hoist system.

11. The method of claim 9, the method further comprising attaching a chain to a cylinder of the hoist system.

* * * * *